Sept. 22, 1970     C. C. L'ALLEMAND     3,529,784
ANTIVIBRATION SPINDLE
Filed Jan. 5, 1968     2 Sheets-Sheet 1
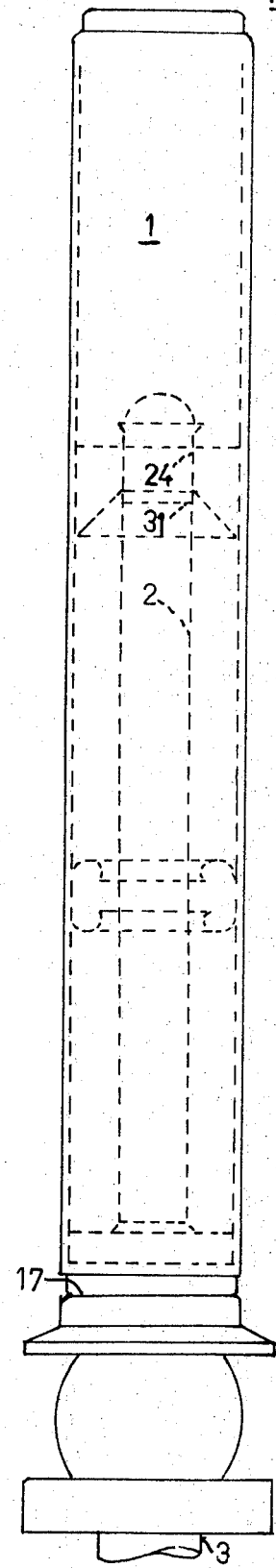
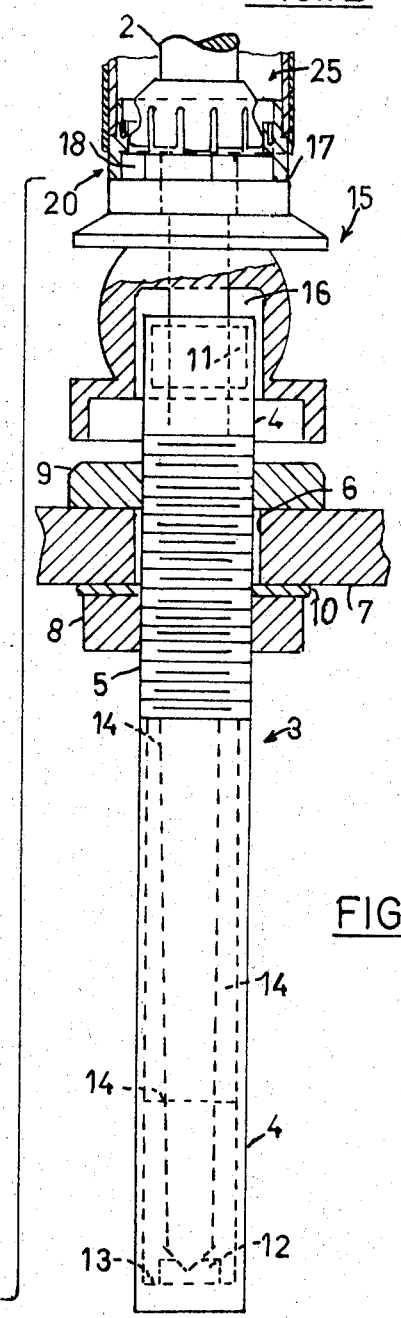

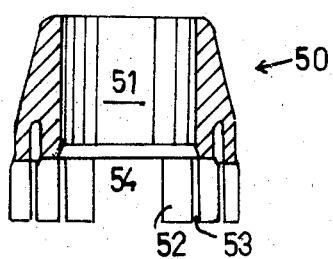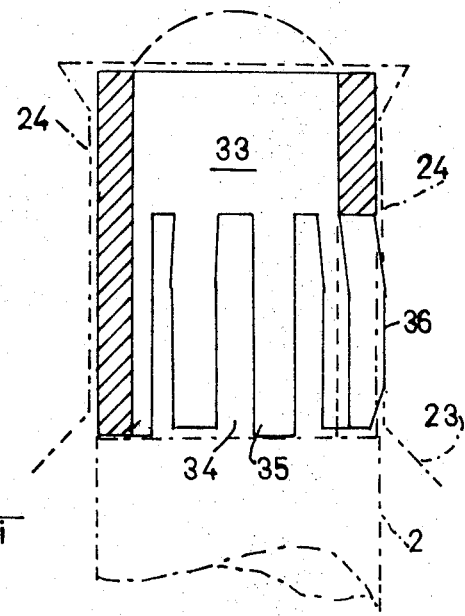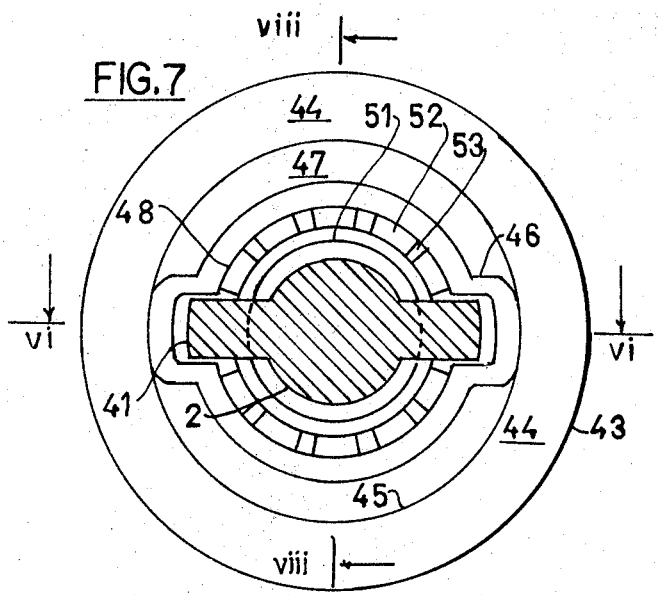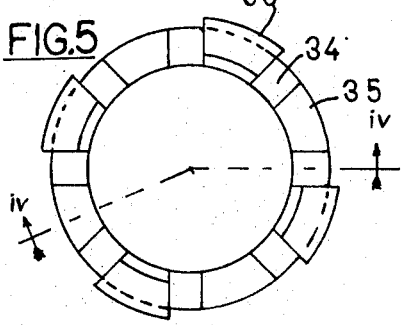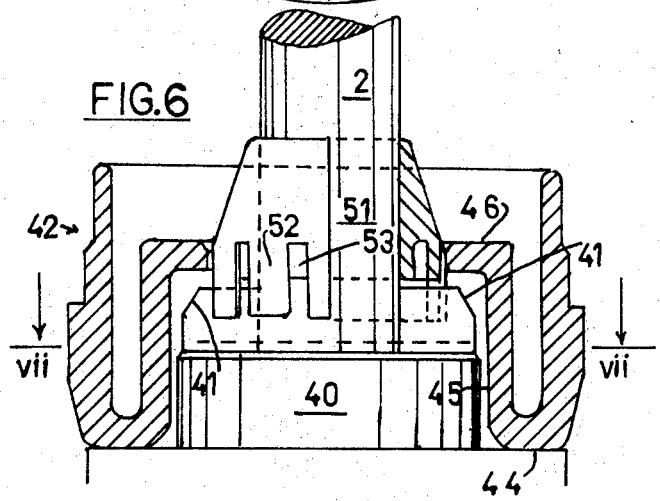

United States Patent Office 3,529,784
Patented Sept. 22, 1970

3,529,784
ANTIVIBRATION SPINDLE
Charles C. L'Allemand, Murray Hill, N.J., assignor, by mesne assignments, to Baldt Corporation, a corporation of Delaware
Filed Jan. 5, 1968, Ser. No. 651,805
Int. Cl. B65h 75/30
U.S. Cl. 242—46.21      8 Claims

ABSTRACT OF THE DISCLOSURE

A draw twister spindle is provided with resilient elements for engaging in the drive cap and/or upper bearing of a pirn, minimizing the effects of clearance and cushioning and damping vibration.

---

This invention relates to textile machine spindles, and more particularly to draw twister spindles and the mounting of draw twister tubes or pirns thereon.

Prior L'Allemand application, Ser. No. 623,386, filed Mar. 15, 1967, for Pirn With Spindle Snugging Mounting and companion L'Allemand application Ser. No. 651,806, filed July 7, 1967, for Spindle Snugging Pirn, discloses pirn structures for minimizing the effects of drive cap clearance and/or pirn upper bearing clearance, resilient spindle gripping elements being incorporated in the pirn. The present invention is directed to spindle constructions adapted to use with existing pirns, fo robtaining the advantages of the pirn structures of the said applications, at least in part, while avoiding the expense of extensive pirn replacement or modification. Preferably, resilient elements are provided in the form of adapters, permitting the use of existing spindles.

It is an object of the invention to provide an improved form of anti-wear spindle bushing, whereby the objectionable effects of clearance between spindle and pirn are reduced.

Another object is to reduce load on the spindle bearings, and particularly the upper bolster bearing, prolonging bearing life and increasing spindle rotation speeds.

A further object is to minimize vibration and impact effects.

With the foregoing objects in mind, as well as others which will appear in the following full description, the invention will now first be fully described with reference to the accompanying drawing, and the features forming the invention will then be pointed out in the appended claims.

In the drawing:

FIG. 1A and FIG. 1B is a somewhat schematic view in side elevation of a pirn and spindle embodying the invention in a preferred form of embodiment;

FIG. 2 is an exploded view of cooperating pirn and spindle elements of the structure of FIG. 1;

FIG. 3 is a bottom view of a resilient bushing element of FIGS. 1 and 2;

FIG. 4 is a much enlarged axial section on the line iv—iv of FIG. 5, showing the upper resilient bushing element;

FIG. 5 is a bottom view of the element of FIG. 4;

FIG. 6 is a much enlarged view showing a modified drive end structure, the view being in elevation as to the spindle, half-section as to the resilient bushing and full section as to the pirn drive cap, the sections being on the line vi—vi of FIG. 7;

FIG. 7 is a bottom elevation view as to the pirn and resilient bushing, the spindle being sectioned on the line vii—vii of FIG. 6; and FIG. 8 is an axial section on the line viii—viii of FIG. 7, of the resilient bushing, removed from the pirn and spindle.

The pirn (FIG. 1A) is shown as mounted on a spindle 2 which is rotatively supported in the bolster 3 (FIG. 1B).

The bolster comprises a tubular casing 4, which has a threaded section 5 passing through an opening 6 in the machine frame 7 and secured thereto by nuts 8, 9 and washer 10. This is a so-called "rigid" mounting, but the invention is also applicable to use with bolsters having the so-called "flexible" mounting, in which the bolster is weighted and secured to the frame by spring pressed and gasket elements having vibration absorption characteristics.

The lower end of the spindle blade 2 is supported in the bolster by means of an upper bearing 11, which is a roller bearing and provides transverse support, and a footstep bearing 12, which furnishes vertical support. The foostep bearing may slide horizontally on surface 13 at the bottom of the bolster casing, but is yieldingly urged toward a central position by sleeve 14 which incorporates a spirally slotted tubular spring element and viscous vibration damping means, such as an oil filled coil. This bolster construction permits dynamic centering of the combined mass of the bobbin and spindle, as well as adjustment of the rotation axis as the amount of yarn wound onto the pirn increases. Such vibration as occurs from time to time, and insofar as it is transmitted to the lower part of the spindle blade is at least partly absorbed by the sleeve 14. It is, however, of great importance to reduce the vibration of pirn and spindle components above the bolster, and the bolster structure cannot be expected to perform this function. The present invention provides means, as later described, which are incorporated in the upper half of the spindle blade and in the pirn for reducing vibration.

The whorl 15 has an opening 16 which accommodates the upper end of the bolster, so as to bring the pirn base and bearing 11 as closed together as practicable. The upper surface 17 of the whorl supports the pirn 1 and carries polygonal drive lug 18 which engages in a correspondingly shaped socket 19 in the drive end cap 20. Details of this drive connection, as well as other details of the pirn construction which are of no interest in themselves in the present application, are disclosed in application Ser. No. 623,386, above mentioned. The pirn barrel may comprise a steel tube 21 with plastic cover 22, and have an upper bearing element 23 press-fitted in it, as also the drive end cap 20.

The concentricity of the pirn on the spindle will depend on the concentricity of the tubular portion 24 of the pirn upper bearing 23, with the outer surface of the pirn barrel, and upon the lower centering means, which, in the structure shown, is incorporated in the lug 18 and socket 19, and the concentricity of the socket with the pirn barrel outer surface. Any clearances must be added in, in figuring the over all eccentricity.

The expected clearances and eccentricities are indicated sufficiently for present purposes in the ISO standards (ISO TC72/GTa[Secr.68]90, April 1964, pages 1 and 2, and 91, April 1964, pages 1 and 2), which indicate run out readings not to exceed 0.006″ at the lower centering point (19) and 0.008″ at the upper centering point (24). In addition, diametral clearances up to 0.004″ may exist. American practice, for which there are no published accepted standards, is better, so that the just stated figures may be accepted as stating the departures from exact concentricity and precise fit which are to be expected.

At high speeds, the spindle, pirn and mass of yarn winding onto it, center dynamically, this action being permitted by the deflection of the spindle, and particularly by the lateral movement of the footstep bearing. The load on the roller bearing 11 varies with the weight of the package, the rotary speed, the eccentricity and the clearance. A tendency to vibration may occur at various operating speeds, for constant package weight, or at various package weights, for constant operating speed. The forces involved are sufficient to produce hammering and fretting, with jumping of the pirn occurring in some cases. It is desirable to reduce eccentric pirn movement as much as possible, so as to minimize the bolster bearing load and cushion any impacts before transmission thereof down the spindle blade into the bolster.

In the arrangement of the present invention, the centering action of the drive end cap is supplemented by the resilient bushing or adapter 25. This element has a central tubular part 26 and an outer depending flange or skirt 27, which is formed with slots 28, dividing it up into a number of spring tongues 29. The part 26 is press-fitted or otherwise secured to the spindle 2 and the fingers or tongues 29 engage in the concentric bore 30, being compressed radially inward thereby and exerting a centering force thereon. At the same time the tongues resist rotary movement of the pirn relative to the spindle by their frictional engagement in bore 30. Impact of the elements is cushioned and absorbed so as not to be transmitted down the spindle blade.

The adapter 25 may be molded from nylon, ABS resin or other materials, in whole or in part, and may be wholly or partly formed from steel or other suitable metals. The frictional grip, spring restoring force for given lateral displacement and centrifugal gripping effect may all, accordingly, be selected for obtaining the best action under the given operating conditions.

The relation between displacement of the pirn and the restorative spring force may be non-linear, reducing tendency to vibration, and also suppressing critical transition positions in the adjustment of the rotation axis in response to increased centrifugal force on the pirn.

The formation of the resilient gripping elements as elongated flexing elements is of importance in providing a considerable stressing under minimum displacement conditions while avoiding excessive pressure under maximum displacement. The use of a surface such as 30, which is not rigidly supported by the barrel, is of great importance—if the barrel should be compressed, the surface 30 may remain substantially unaffected, permitting the use of much smaller clearances between the solid part of the element 25 and surface 30, while avoiding danger of the parts binding and interfering with removal of the pirn.

The tip of the spindle blade 2 is reduced in diameter, forming a shoulder 31, and is fitted with resilient bushing 32, which engages in the pirn bearing 24. The upper, unslotted, part 33 serves for mounting the bushing on the spindle tip while the lower part is slotted as at 34 and formed with straight wall elements 35 which seat on shoulder 31, and outwardly bowed elements 36 which form the resilient tongue elements engaging in the bearing 24. As in the case of the adapter 25, the bushing may be constructed of any of a variety of materials and combinations of materials. In the embodiment shown, the bushing is molded in one piece from ABS, nylon, or other suitable plastic. The objectionable effects of clearance are eliminated, in substantially the same manner as just discussed in connection with the adapter 25.

FIGS. 6, 7 and 8 show a modified form of drive cap engaging adapter, as used with a so-called "dog" drive. In this case, the whorl carries a concentric centering base section 40, surmounted by the dogs 41 at each side of the spindle blade 2. A molded drive end cap 42 has an outer wall 43 terminating in an annular rim 44 which sits on the whorl. An inner cylindrical wall 45 extends upwardly from the inner edge of rim 44, cooperating with the blade base section 40 to center the pirn, and being formed, above the base section 40 with sockets 46 receiving the dogs 41, and with an annular flange 47 and collar 48, the inner surface of which is engaged by the adapter. The adapter 50 comprises an upper tubular part 51 which is press fitted or otherwise secured to the spindle blade 2, and a slotted skirt forming a set of resilient tongues separated from each other by the slots 53 and by the two diametrally opposite gaps 54 which accommodate the dogs 41. The action of the adapter in taking up clearance, absorbing impact and reducing vibration is like that of the embodiment of FIGS. 1 to 3.

What is claimed is:

1. In a draw twister spindle having centering means and drive means adapted to center and drive a pirn mounted on said spindle, said pirn having an upper bearing and a drive end cap, said centering means of the spindle comprising a cylindrical centering surface at the upper end of the spindle adapted to enter and center the upper bearing of the pirn and a cylindrical centering surface at the base of the spindle adapted to enter and center the drive end cap of the pirn and said drive means of the spindle comprising an integral drive lug at the base of the spindle adapted to enter and engage a corresponding lug-receiving socket formed in the drive end cap of the pirn, the improvement which comprises an antivibration bushing mounted on the spindle with a press fit, said antivibration bushing being integrally formed with a plurality of circumferentially spaced, downwardly extending and radially compressible spring tongues that are adapted to bear resiliently against the inner surface of a pirn mounted on the spindle.

2. The draw twister spindle according to claim 1 in which the antivibration bushing is mounted on the upper end of the spindle, said bushing comprising an upper cylindrical portion, said cylindrical portion constitutes said upper centering surface, said bushing fitting onto the upper end of the spindle and having a slotted lower portion having the foresaid circumferentially spaced and radially compressible spring tongues.

3. The draw twister spindle according to claim 2 in which the upper end of the spindle is formed with a cylindrical end section of smaller diameter than the cylindrical middle section of the spindle, the junction of the middle section with the end section of the spindle providing a shoulder on which the antivibration bushing seats.

4. The draw twister spindle according to claim 1 in which the antivibration bushing is mounted on the lower end of the spindle adjacent the drive means of the spindle, said bushing comprising an upper cylindrical portion fitting snugly onto the lower end of the spindle and a slotted lower portion having the aforesaid circumferentially spaced and radially compressible spring tongues.

5. The draw twister spindle according to claim 4 in which the drive lug of the spindle projects radially from the spindle, in which the upper cylindrical portion of the antivibration bushing is mounted on the spindle directly above said radially extending drive lug and in which the circumferentially spaced spring tongues extend downwardly adjacent each side of said drive lug.

6. The draw twister spindle according to claim 1 in which said pirn centering means have means for locating the pirn on the centering means of the spindle with a predetermined maximum clearance between said two centering means, and in which the spring tongues of said antivibration bushing are compressed radially inwardly by said pirn at least the amount of said clearance.

7. The draw twister spindle and pirn combination according to claim 6 in which the antivibration bushing is mounted on the upper end of the spindle.

8. The draw twister spindle and pirn combination according to claim 6 in which the antivibration bushing is mounted on the lower end of the spindle adjacent the drive means of the spindle.

References Cited

UNITED STATES PATENTS

| | | | |
|---|---|---|---|
| 1,809,049 | 6/1931 | Lemoine et al. | 242—46.5 XR |
| 2,249,151 | 7/1941 | Magrath | 242—46.5 |
| 2,488,879 | 11/1949 | Pichette | 57—130 |
| 2,625,335 | 1/1953 | Atwood | 242—46.21 |
| 2,674,415 | 4/1954 | Lyth | 242—46.5 |
| 3,300,153 | 1/1967 | Fenn | 242—46.21 |

FOREIGN PATENTS

| | | |
|---|---|---|
| 222,438 | 2/1925 | Great Britain. |
| 606,555 | 7/1960 | Italy. |

STANLEY N. GILREATH, Primary Examiner

W. H. SCHROEDER, Assistant Examiner

U.S. Cl. X.R.

242—118.3